(12) United States Patent
Shibano et al.

(10) Patent No.: US 10,222,657 B2
(45) Date of Patent: Mar. 5, 2019

(54) DISPLAY DEVICE AND METHOD FOR MANUFACTURING DISPLAY DEVICE

(71) Applicant: Japan Display Inc., Minato-ku (JP)

(72) Inventors: Fumihito Shibano, Tokyo (JP); Kenji Tanase, Tokyo (JP); Yuzo Kanari, Tokyo (JP); Satoshi Chinen, Tokyo (JP)

(73) Assignee: Japan Display Inc., Minato-ku (JP)

( * ) Notice: Subject to any disclaimer, the term of this patent is extended or adjusted under 35 U.S.C. 154(b) by 0 days.

(21) Appl. No.: 15/441,955

(22) Filed: Feb. 24, 2017

(65) Prior Publication Data

US 2017/0248810 A1 Aug. 31, 2017

(30) Foreign Application Priority Data

Feb. 25, 2016 (JP) .................................. 2016-033998

(51) Int. Cl.
*G02F 1/1339* (2006.01)
*G02F 1/1333* (2006.01)
*G02F 1/1335* (2006.01)
*G02F 1/1341* (2006.01)
*G02F 1/1368* (2006.01)

(52) U.S. Cl.
CPC .......... *G02F 1/1339* (2013.01); *G02F 1/1341* (2013.01); *G02F 1/1368* (2013.01); *G02F 1/133345* (2013.01); *G02F 1/133528* (2013.01); *G02F 2201/123* (2013.01); *G02F 2201/56* (2013.01)

(58) Field of Classification Search
CPC ............. G02F 1/1339; G02F 1/133345; G02F 1/133528; G02F 1/1341; G02F 1/1368; G02F 2201/123; G02F 2201/56
See application file for complete search history.

(56) References Cited

U.S. PATENT DOCUMENTS

2015/0301370 A1* 10/2015 Moriwaki ............. G02F 1/1339 349/42
2016/0202516 A1* 7/2016 Watanabe ............. G02F 1/1339 349/130

FOREIGN PATENT DOCUMENTS

JP 11-305246 11/1999
JP 2010-139657 6/2010

* cited by examiner

*Primary Examiner* — Nathanael R Briggs (57) ABSTRACT

According to one embodiment, a first substrate includes a first area, a second area, a third area, a fourth area and a fifth area in a planar view. In the first substrate, an organic insulating film is present in the second and the third areas, is present neither in the third area nor in the fifth area, and forms an adjustment area. A conductive film is provided on the organic insulating film, the third area, the fourth area and a part of the fifth area. A sealing material is present in a part of the second area, the third area, the fourth area and a part of the fifth area to attach the first substrate and a second substrate. A through hole penetrates the first and the second substrates.

5 Claims, 10 Drawing Sheets

DISPLAY DEVICE AND METHOD FOR MANUFACTURING DISPLAY DEVICE

CROSS-REFERENCE TO RELATED APPLICATIONS

This application is based upon and claims the benefit of priority from Japanese Patent Application No. 2016-033998, filed Feb. 25, 2016, the entire contents of which are incorporated herein by reference.

FIELD

Embodiments described herein relate generally to a display device and a method for manufacturing a display device.

BACKGROUND

Recently, liquid crystal display panels have been used for wearable devices, which are assumed to be worn by the user. Liquid crystal display panels can display pictures, letters, drawings, figures, etc. Since the display content can be switched, liquid crystal display panels are expected to be used in various ways as wearable devices. Normally, a liquid crystal display panel comprises a first substrate on which a plurality of pixel electrodes are arranged, a second substrate facing the first substrate, and a liquid crystal layer interposed between the first substrate and the second substrate. The liquid crystal display panel further comprises an outer circumferential sealing material. The sealing material integrates the substrates along the outer circumferential portions of the substrates and encapsulates the liquid crystal.

The above wearable devices include a watch type integrated with a clock mechanism comprising a pointer. This device requires a through hole which penetrates the liquid crystal display panel to allocate the axis of rotation of the pointer. To encapsulate the liquid crystal between the substrates, an inner sealing material having a ring shape should be provided around the through hole.

DETAILED DESCRIPTION

To manufacture a wearable device, an outer sealing material and an inner sealing material are applied to a first substrate. A second substrate is attached to the first substrate. A liquid crystal is injected.

Thus, the manufacturing process requires a step of applying the inner sealing material around a small through hole so as to have a ring shape. In this step, an appropriate amount of sealing material needs to be applied in a ring shape in advance in a circular pattern. When the second substrate is attached to the first substrate, the substrates are pressed. At this time, the line width of the inner sealing material should not exceed a predetermined width. However, when the sealing material is unicursally applied in a ring shape, the sealing material is redundant in the connected portion to surely connect the start and the end of the application. In the conventional device, in many cases, the inner sealing material extends beyond the scope of the assumption when the second substrate is attached to the first substrate. As a result, the width of a light-shielding film has to be increased to shield the sealing material from light, in other words, such that the sealing material is not exposed to outside. When the line width of the sealing material is increased, a part of the sealing material is extended to a display area and disturbs display.

In consideration of the above problem, the embodiments described herein aim to provide a display device and a method for manufacturing a display device, preventing the extension of the line width of a sealing material to the outer circumferential side, decreasing the width of a light-shielding film, and enhancing reliability of display in a display area.

In general, according to one embodiment, a display device comprises:

a first substrate comprising a first area, a second area, a third area, a fourth area and a fifth area from an end portion to an inner side in a planar view;

an organic insulating film which is present in the second area and the fourth area, is present neither in the third area nor in the fifth area, and forms an adjustment area whose thickness changes in the fourth area;

a conductive film continuously formed on the organic insulating film of the second area, the third area, the organic insulating film of the fourth area and a part of the fifth area;

a second substrate facing the first substrate;

a sealing material which is present in a part of the second area, the third area, the fourth area and a part of the fifth area, and is used to attach the first substrate and the second substrate; and a through hole which is adjacent to an inner side of the fifth area and penetrates the first substrate and the second substrate.

The embodiments will be specifically described below.

The disclosure is merely an example, and proper changes in keeping with the spirit of the invention, which are easily conceivable by a person of ordinary skill in the art, come within the scope of the invention as a matter of course. In addition, in some cases, in order to make the description clearer, the widths, thicknesses, shapes, etc., of the respective parts are illustrated schematically in the drawings, rather than as an accurate representation of what is implemented. However, such schematic illustration in no way restricts the interpretation of the invention. In addition, in the specification and drawings, structural elements which function in the same or a similar manner to those described in connection with preceding drawings are denoted by like reference numbers, detailed description thereof being omitted unless necessary.

A first embodiment is shown.

Figure 1A:
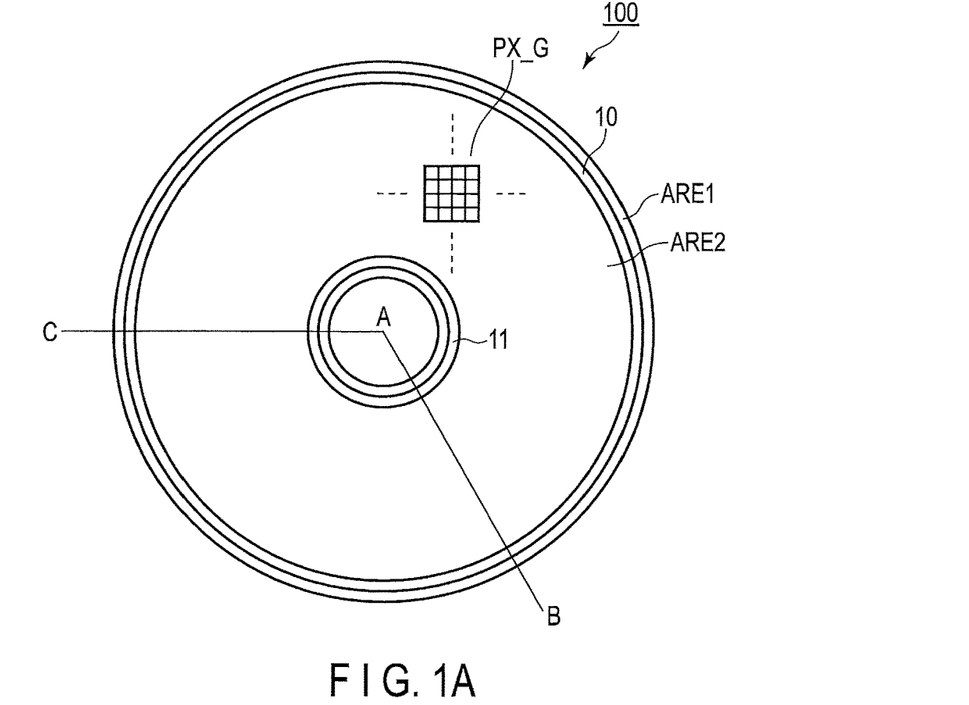
FIG. 1A is a planar view schematically showing a first substrate of a display device according to one embodiment.
Figure 1B:
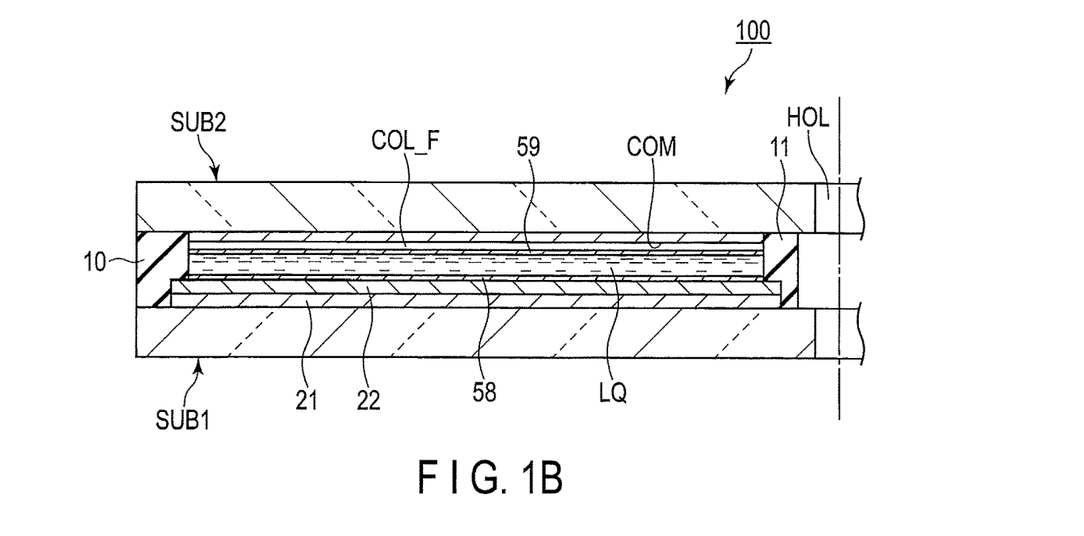
FIG. 1B schematically shows the structure of the cross-sectional surface of the display device according to the embodiment.

FIG. 1A is a planar view schematically showing the structure of a first substrate SUB1 of a display device 100. FIG. 1B schematically shows the cross-sectional surface of the display device 100. The first substrate SUB1 (which may be called an array substrate) comprises, for example, a glass plate as the base plate, and a group of subpixels PX_G including a plurality of subpixels in a display area ARE2 on a side of the glass plate. As shown in FIG. 1B, the first substrate SUB1 is integrated with a second substrate SUB2 by sealing materials 10 and 11. A liquid crystal layer LQ is encapsulated between the first substrate SUB1 and the second substrate SUB2. FIG. 1B schematically shows, on the liquid crystal layer side of the first substrate SUB1, a semiconductor layer 21 structuring a group of subpixels, a pixel electrode layer 22 forming a pixel electrode, and the layer of an alignment film 58 facing the liquid crystal layer and defining the direction of alignment of the liquid crystal. FIG. 1B schematically shows, on the second substrate SUB2, a color filter layer COL_F, a common electrode COM, and the layer of an alignment film 59 facing the liquid crystal layer and defining the direction of alignment of the liquid crystal.

In FIG. 1A, the display device 100 is circular in a planar view (specifically, when viewed perpendicularly to the substrate surface). However, the display device 100 may be shaped in various ways. For example, the display device 100 may be rectangular, triangular or polygonal. The present embodiment is a display device integrated with a device having the axis of rotation, for example, a clock. Since the present embodiment is applied to a circular wearable device, the first substrate SUB1 and the second substrate SUB2 are circular in a planar view. In the example of FIG. 1, sealing materials 10 and 11 have a circular ring shape in a planar view.

Figure 2:
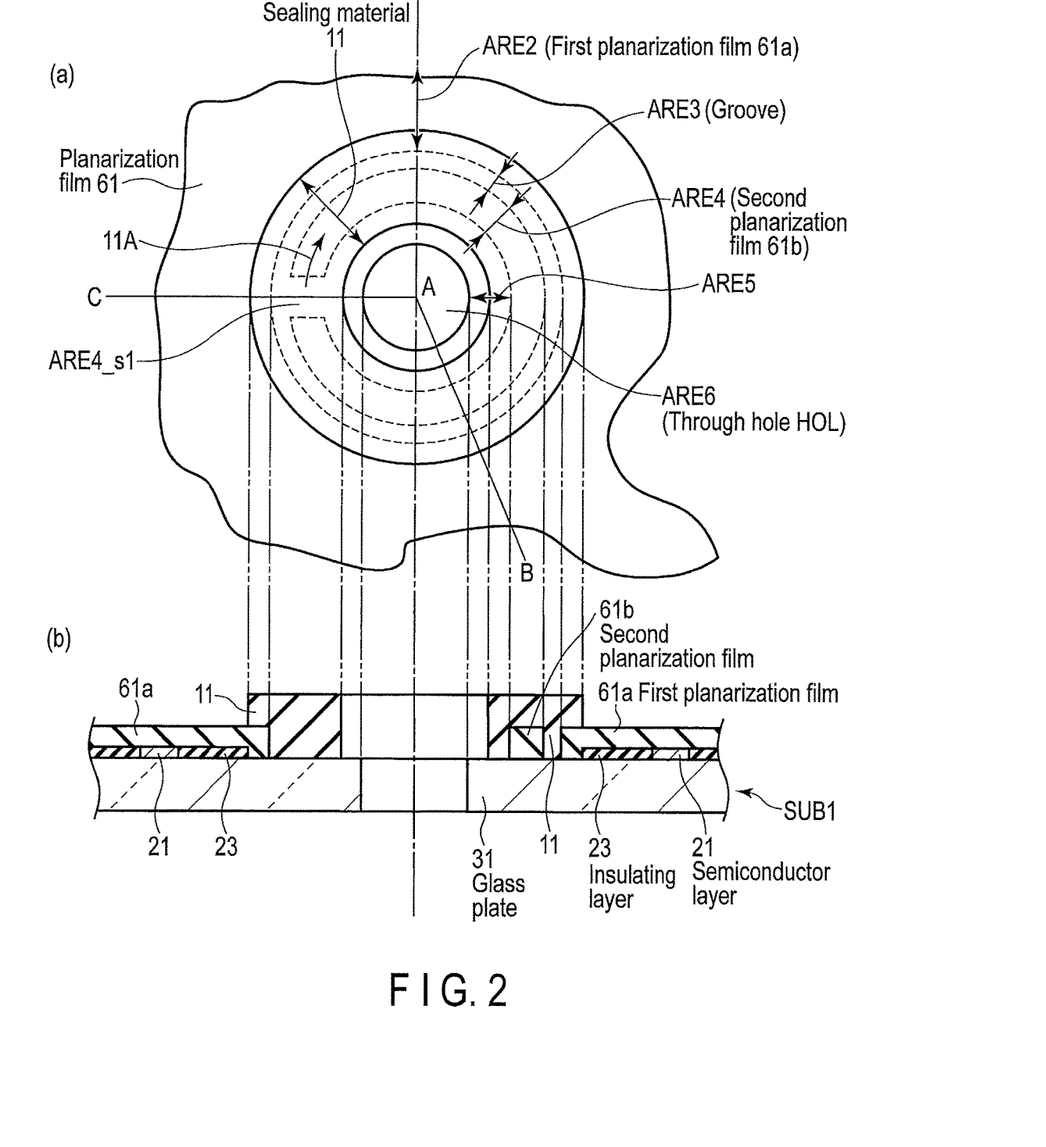
FIG. 2 includes a planar view showing the vicinity of the central portion of the first substrate of the display device according to the embodiment, and a cross-sectional view taken along line C-A-B.
Figure 3:
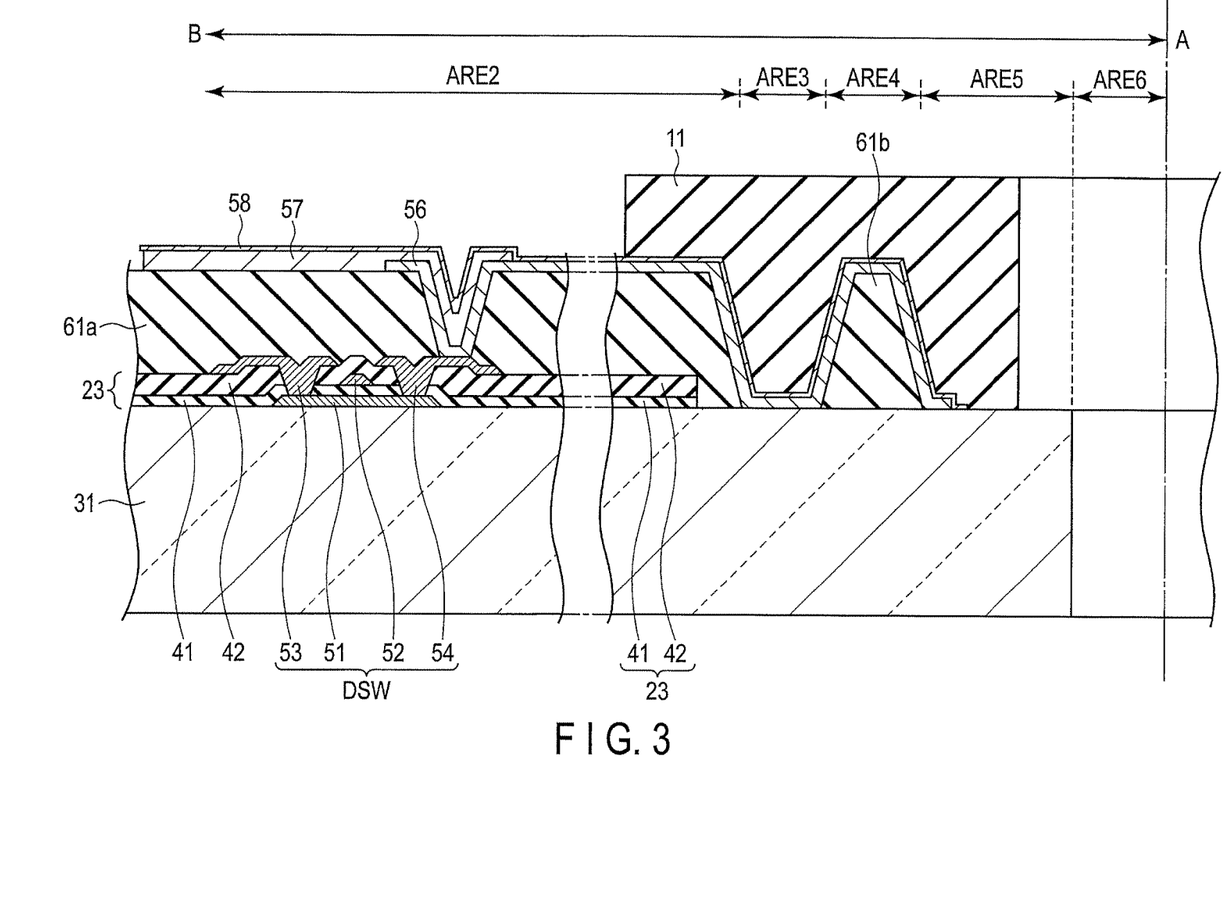
FIG. 3 is a cross-sectional view taken along line A-B shown in FIG. 2.
Figure 4:
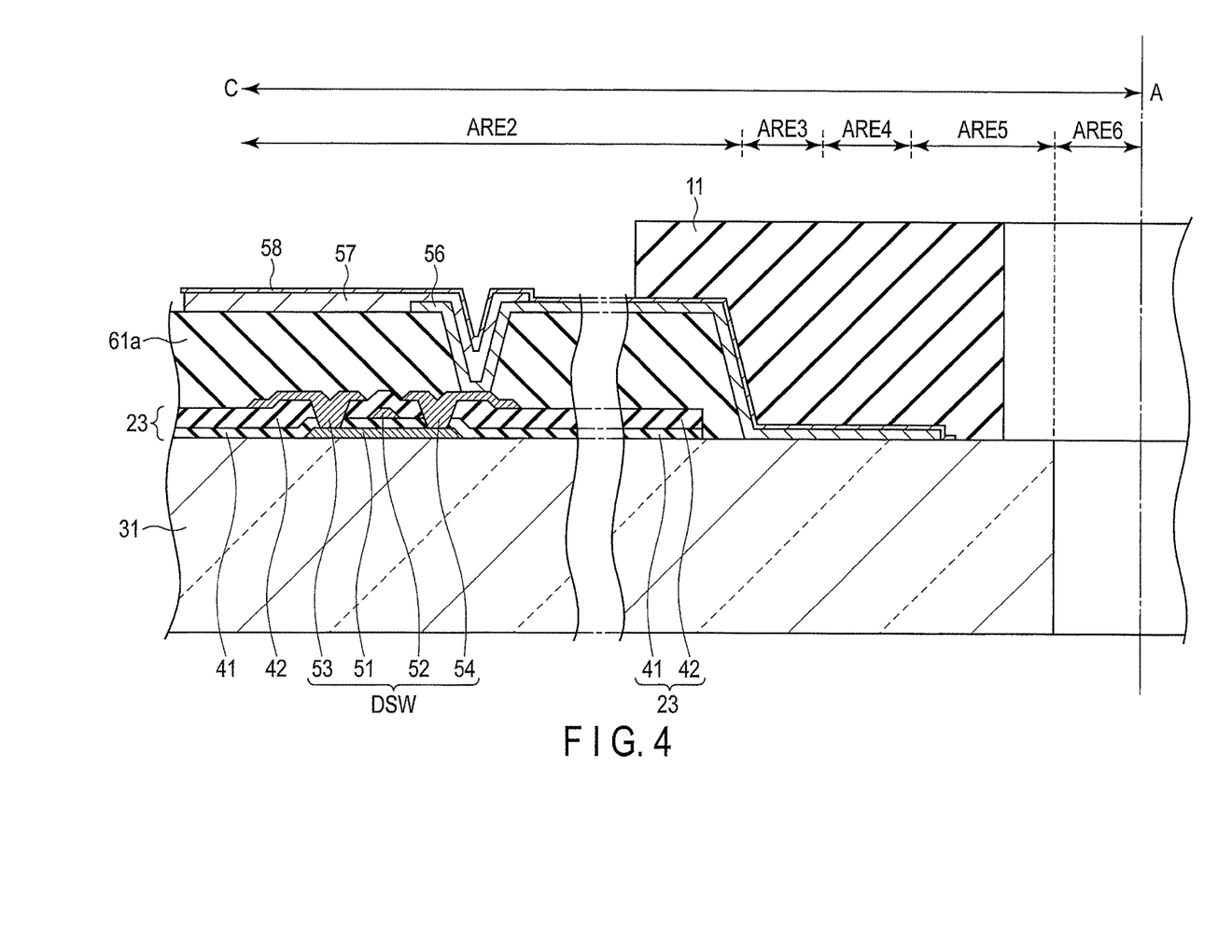
FIG. 4 is a cross-sectional view taken along line A-C shown in FIG. 2.

The display device 100 is explained with enlarged views of the vicinity of a through hole HOL. See FIG. 2 and FIG. 4. FIG. 2 includes a planar view showing the vicinity of the central portion of the first substrate SUB1, and a cross-sectional view taken along line C-A-B. FIG. 3 is a cross-sectional view taken along line A-B shown in FIG. 2. FIG. 4 is a cross-sectional view taken along line A-C shown in FIG. 2.

As shown in FIG. 2 and FIG. 4, in a planar view, the liquid crystal layer LQ side of the first substrate SUB1 comprises a first area ARE1, which is the border area shown in FIG. 1A, the second area ARE2, a third area ARE3, a fourth area ARE4, a fifth area ARE5 and a sixth area ARE6 from the end portion (the outer circumferential edge) to the inner side (the inner circumferential side). The through hole HOL (see FIG. 2) is provided in the sixth area ARE6 such that the bearing of a pointer and the axis of the bearing pass through the through hole HOL.

The second area ARE2 is provided from the outer circumferential side to the inner circumferential side. A display area is set in the second area ARE2. As shown in FIG. 3, a semiconductor channel 51 is formed on a glass plate 31 in the display area. A drive switching element DSW for applying drive potential to a pixel electrode 57 is formed by using the semiconductor channel 51. In the present embodiment, a reflective display system (in other words, a system for reflecting outside light on the pixel electrode and outputting the light to the second substrate side) is assumed. Thus, the pixel electrode 57 is formed of, for example, silver. The drive switching element DSW comprises the semiconductor channel 51, a gate electrode 52, a source electrode 53 and a drain electrode 54. The semiconductor channel 51 comprises a channel area at the central position facing the gate electrode 52. The source electrode 53 is connected to a source area on one side of the channel area. The drain electrode 54 is connected to a drain area on the other side. An insulating layer 41 provided between the gate electrode 52 and the semiconductor channel 51 is a first insulating layer which covers the layer of the semiconductor channel 51. An insulating layer 42 is a second insulating layer which covers the layer of the gate electrode 52. The first insulating layer 41 and the second insulating layer 42 extend to the vicinity of the inner circumferential end portion of the second area ARE2 as an insulating layer 23 shown in FIG. 2.

In the actual device, a plurality of drive switching elements DSW corresponding to a plurality of subpixels are arrayed in a two-dimensional manner inside the first substrate SUB1. However, as a representative of the drive switching elements DSW, FIG. 3 shows only one drive switching element DSW. In the present embodiment, a memory type liquid crystal (memory-in-pixel [MIP]) display system is employed. Thus, a memory for retaining data 1 or 0 is provided so as to correspond to each subpixel. Although not shown in the drawings, for example, a switching element for structuring the memory and a write switching element for writing data from a data line to the memory are provided.

The source electrode 53 and the drain electrode 54 are formed of, for example, metal such as aluminum. The gate electrode 52 is connected to a scanning signal line (not shown) formed on the first insulating layer 41. The source electrode 53 is connected to a video signal line (not shown) formed on the second insulating layer 42.

Organic insulating films 61a and 61b are formed on the semiconductor layer 21. Organic insulating film 61a is formed at least in the second area ARE2. Organic insulating film 61a serves to planarize the asperity of the semiconductor layer 21. Thus, organic insulating film 61a may be called a first planarization film 61a. The inner circumferential side of the first planarization film 61a extends to the extent that the inner circumferential edge of the insulating layer 23 is covered (see FIG. 2 and FIG. 3). When the first planarization film 61a is formed, the second planarization film (organic insulating film) 61b is also formed in the fourth area ARE4.

The second planarization film 61b basically forms a bank portion having a ring shape. However, the second planarization film 61b has a patterning having a slit (which may be called an adjustment area, a divided area or a gap portion) ARE4_s1 in a part of the second planarization film 61b (see FIG. 2). Organic insulating film (planarization film) 61b of the fourth area ARE4 comprises the adjustment area ARE4_s1 thinner than the other areas at least in a part of organic insulating film 61b. The reasons for providing the adjustment area ARE4_s1 are explained below. In FIG. 2, only one adjustment area ARE4_s1 is shown. However, more than one adjustment area ARE4_s1 may be provided.

On the first planarization film 61a, the pixel electrode 57 is provided so as to correspond to the drive switching element DSW. The pixel electrode 57 and the drain electrode 54 of the drive switching element DSW are connected to each other by metal formed in a contact hole, for example, indium tin oxide (ITO) 56 (connective metal or a conductive film) having transparency. The contact hole is formed in the first planarization film 61a.

In many cases, the subpixels on the innermost circumferential side of the second area ARE2 are structured as dummy subpixels. When the subpixels are dummy subpixels, the drive switching elements DSW are maintained so as to be always in an off-state. Thus, the actual driving is not performed. The ITO (connective metal or conductive film) 56 structuring a part of each dummy subpixel is formed so as to extend to the third area ARE3, the fourth area ARE4 and a part of the fifth area ARE5 after the planarization film 61 is formed.

Further, alignment film 58 is formed over the entire surfaces of the ITO 56 and the pixel electrode 57. Alignment film 58 may be formed in the range of the second area ARE2.

The first substrate SUB1 is attached to the second substrate SUB2. In this case, as shown in FIG. 1A, FIG. 1B and FIG. 3, sealing materials 10 and 11 are applied to the first substrate SUB1. In particular, the application state of the inner circumferential sealing material 11 is as shown in FIG. 3 and FIG. 4. Specifically, sealing material 11 is applied to a part of the inner circumferential side of the second area ARE2, the third area ARE3, the fourth area ARE4 and a part of the outer circumferential side of the fifth area ARE5. For example, sealing material 11 is applied in the direction of arrow 11A shown in FIG. 2 while sealing material 11 is extruded in a circular pattern from a device for applying a sealing material. When sealing material 11 is applied so as to have a ring shape in this manner, the adjustment area ARE4_s1 is selected as the start and end positions of the application. Thus, the adjustment area ARE4_s1 functions as a buffer portion which absorbs the excessive sealing material applied. In particular, at the start position (that is, the end position) for forming a circle in connection with the application of the sealing material, the application areas of sealing material 11 overlap each other. Thus, the amount of sealing material is greater than that in the other application areas. This excessive sealing material can be absorbed by the adjustment area ARE4_s1 (see FIG. 4 and FIG. 2).

In this way, it is possible to prevent increase in the line width of sealing material 11. As a result, the extension of a part of the sealing material to the display area can be prevented. Thus, display is not disturbed. Further, the width of a light-shielding film can be reduced.

In the above liquid crystal display panel 100, the subpixel including the pixel electrode 57 is driven in the following manner. When a drive signal (video signal) is supplied to the pixel electrode 57 via the drive switching element DSW comprising the semiconductor channel 51, an electric field is generated between the common electrode COM formed on the second substrate SUB2 and the pixel electrode 57. Thus, the liquid crystal is driven, thereby realizing a phototransmissive state. In this manner, the light entering from the outside on the second substrate SUB2 side is reflected on the pixel electrode 57. The reflected light can be visually recognized.

A polarizer is attached to the upper surface of the glass plate of the second substrate SUB2. A reinforcing plate is also attached to the vicinity of the through hole HOL of the second substrate SUB2. The hole of the polarizer is preferably greater than the through hole HOL. When the hole of the polarizer is greater than the through hole HOL, the light-shielding film may be exposed only on the innermost side. However, this exposure can be prevented by providing the inner end of the reinforcing plate so as to be on the inner side in comparison with the inner end of the hole of the polarizer. The reinforcing plate may be provided either on the polarizer or in the same layer as the polarizer. The light-shielding film provided around the through hole HOL on the liquid crystal layer side of the second substrate SUB2 overlaps at least the third area and the fourth area in a planar view. The light-shielding film may at least partially overlap the second area, the third area, the fourth area and the fifth area. The relationship between the polarizer and the reinforcing plate is explained later.

In the above display device, alignment film 58 is provided inside sealing material 11 on the inner circumferential (central) side. The ITO 56 is provided under alignment film 58. In the manufacturing process, alignment film 58 is printed on the ITO, which is metal oxide. Since alignment film 58 has a good affinity for the ITO, the process is easy. Moreover, the adhesiveness to the substrate and the organic film is improved by providing the ITO. In this way, it is possible to prevent moisture intrusion from outside.

When the first substrate SUB1 and the second substrate SUB2 are concentrically attached to each other by sealing materials 10 and 11, the first substrate SUB1 and the second substrate SUB2 are integrated. At this time, an inlet for injecting a liquid crystal into the space between the first substrate SUB1 and the second substrate SUB2 is provided in, for example, sealing material 10. After sealing materials 10 and 11 are cured, and thus, the first substrate SUB1 and the second substrate SUB2 are integrated, the through hole HOL (corresponding to the central axis of the ring formed by sealing material 11) which penetrates the first substrate SUB1 and the second substrate SUB2 is provided. The through hole HOL is the sixth area ARE6 surrounded by the fifth area ARE5. The through hole HOL is formed by using, for example, laser light, so as to be greater than the bearing of the pointer of the clock mechanism incorporated into the liquid crystal panel. Subsequently, a liquid crystal is injected through the inlet. The inlet is sealed. The process for injecting a liquid crystal is performed after the process for making the through hole HOL to prevent the heat or impact of the hole-making process from detrimentally affecting the liquid crystal.

Figure 5:
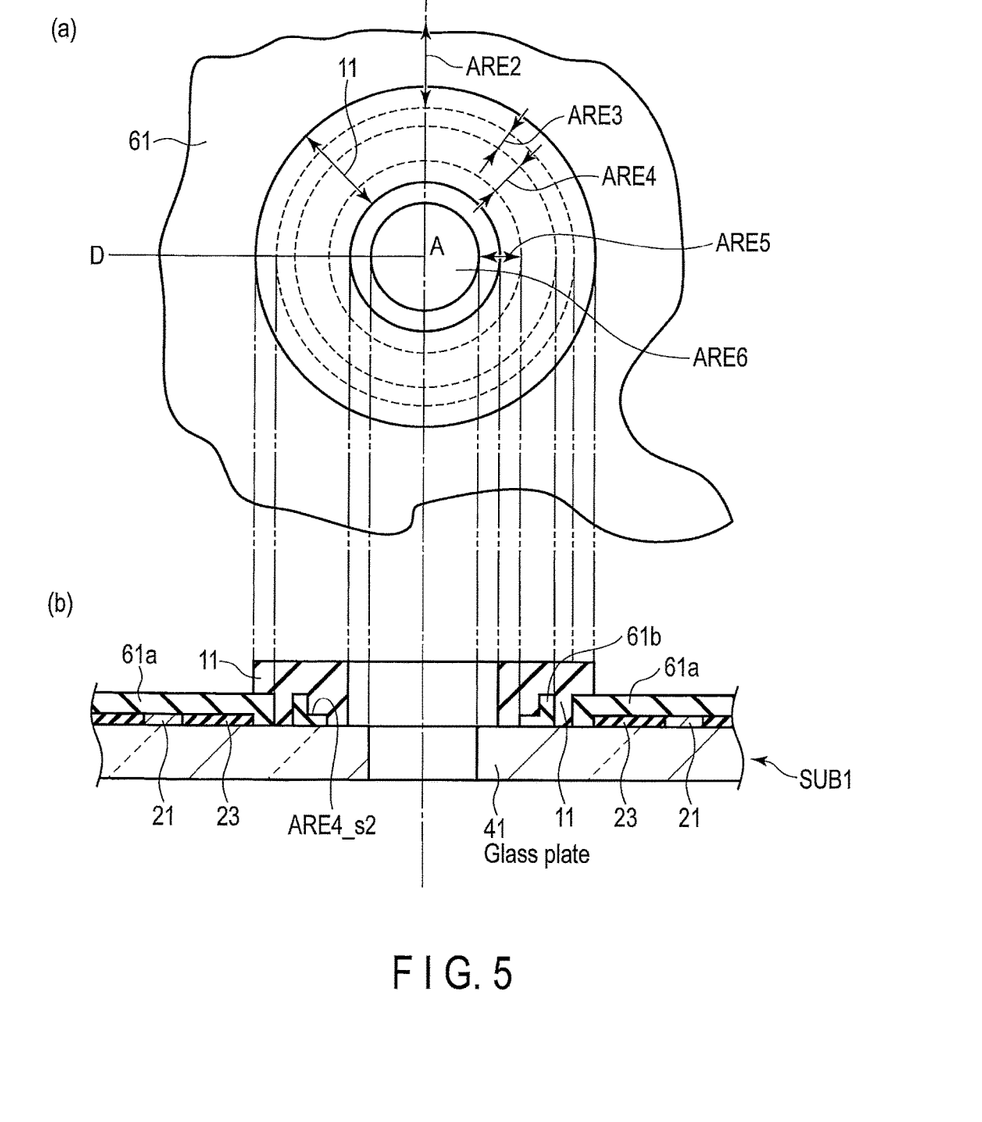
FIG. 5 includes a planar view showing the vicinity of the central portion of a first substrate of a display device according to another embodiment, and its cross-sectional view.
Figure 6:
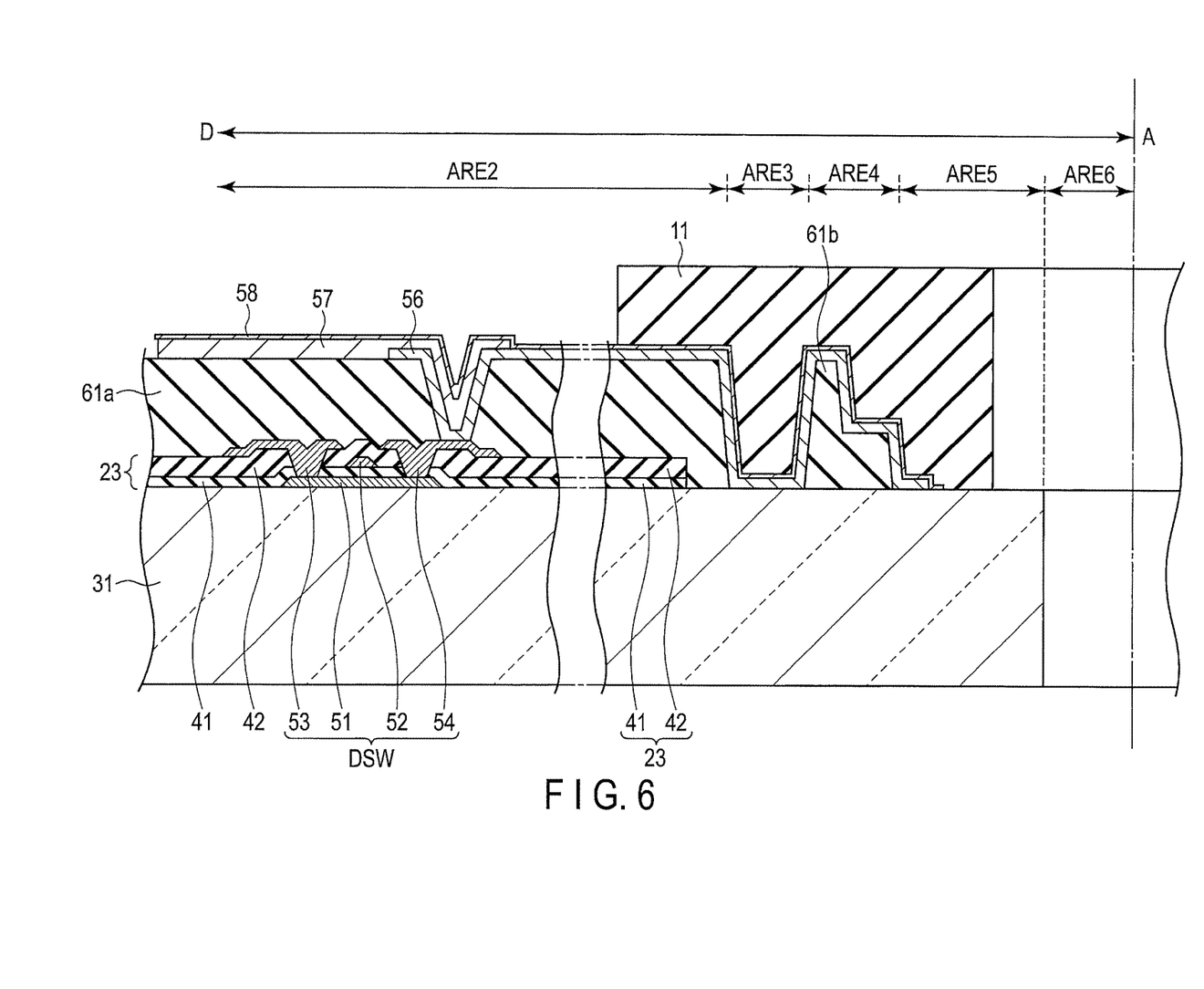
FIG. 6 is a cross-sectional view taken along line A-D shown in FIG. 5.

FIG. 5 and FIG. 6 show a second embodiment. The same structures as FIG. 1 to FIG. 4 are denoted by the same reference numbers as FIG. 1 to FIG. 4. FIG. 5 includes a planar view showing the vicinity of the central portion of a first substrate, and a corresponding cross-sectional view. FIG. 6 is a cross-sectional view taken along line A-D shown in FIG. 5.

The embodiment shown in FIG. 5 and FIG. 6 is different from the aforementioned embodiment in terms of the shape of a second planarization film 61b formed in a fourth area ARE4. In a planar view, the second planarization film 61b has a ring shape. In a cross-sectional view, the second planarization film 61b comprises a low step portion (adjustment area) ARE4_s2 on the inner side. The height of the step portion (adjustment area) ARE4_s2 is preferably greater than or equal to thirty percent and less than or equal to eighty percent of that of the highest portion of the second planarization film 61b.

In the example of FIG. 5 and FIG. 6, the cross-sectional shape of the second planarization film 61b is stepwise. However, the second planarization film 61b may be formed such that the inclined surface is gradually lower toward the inner side.

When the second planarization film 61b comprises the adjustment area ARE_s2, the following effect can be obtained.

It is assumed that a sealing material 11 is excessively applied to the overlapping area of the start and end positions when sealing material 11 is drawn on the second planarization film 61b so as to have a ring shape. Even in this case, sealing material 11 flows to the inner side (the through hole HOL side) by the step or inclination of the second planarization film 61b. This structure prevents the line of sealing material 11 from widening to the second area ARE2 side. As a result, the sealing material does not extend to the display area. In this way, display is not affected by the extension of the sealing material. Moreover, the width of a light-shielding film can be reduced.

Figure 7:
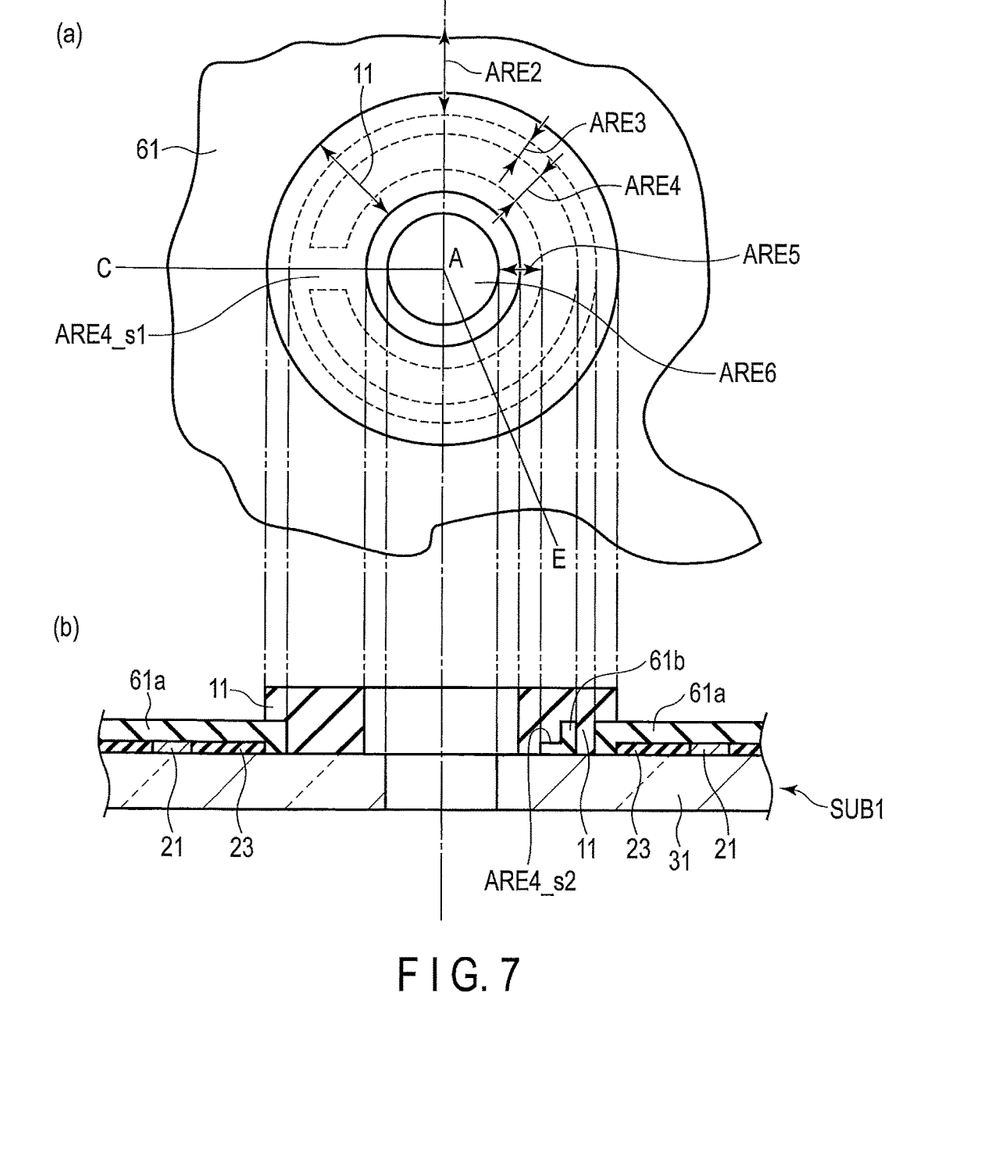
FIG. 7 includes a planar view showing the vicinity of the central portion of a first substrate of a display device according to another embodiment, and a cross-sectional view taken along line C-A-E.

FIG. 7 shows a third embodiment. The same structures as FIG. 1 to FIG. 6 are denoted by the same reference numbers as FIG. 1 to FIG. 6. FIG. 7 includes a planar view showing the vicinity of the central portion of a first substrate, and a corresponding cross-sectional view. The third embodiment comprises both the structure of the embodiment shown in FIG. 1 to FIG. 4 and the structure of the embodiment shown in FIG. 5 and FIG. 6.

A fourth area ARE4 comprises a second planarization film 61b. The second planarization film 61b comprises both an adjustment area ARE4_s1 and an adjustment area ARE4_s2. The same effects as the aforementioned embodiments can be obtained from the third embodiment.

Figure 8:
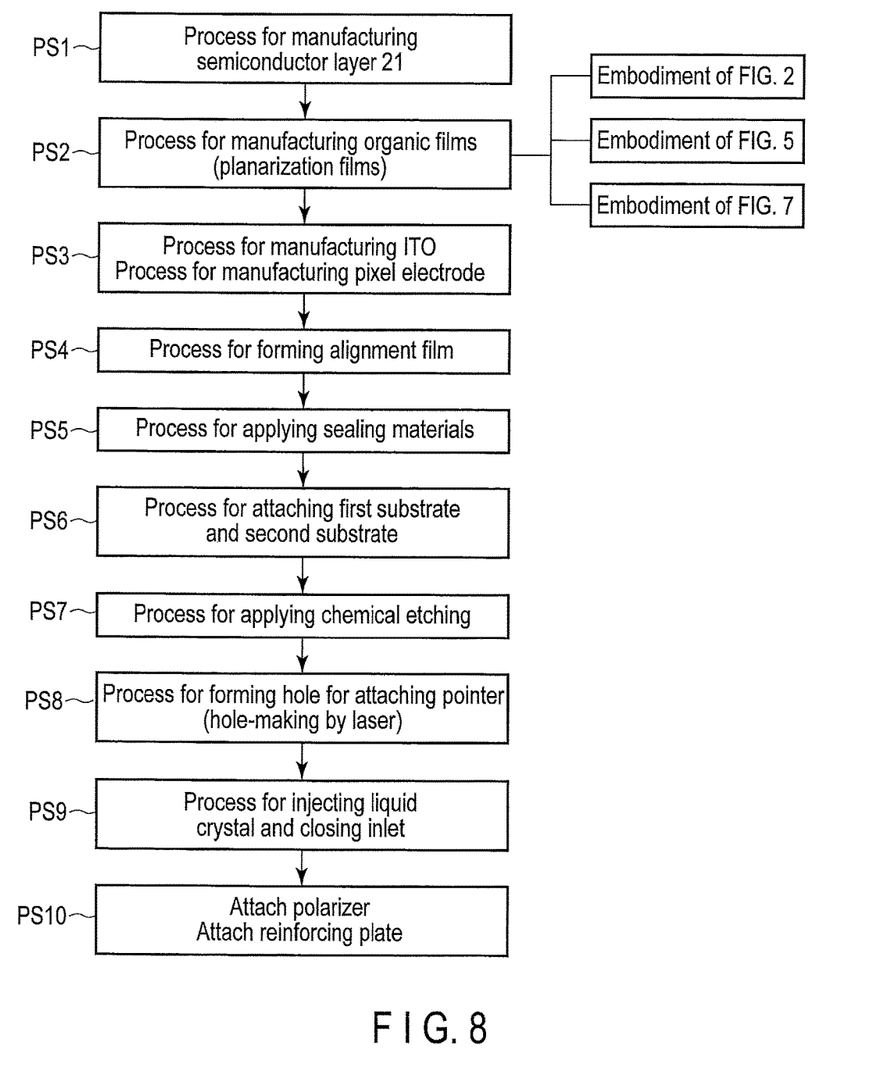
FIG. 8 is shown for schematically explaining a process for manufacturing the display device according to the present embodiment.

FIG. 8 is a process explanatory diagram schematically showing a process for manufacturing the display device of each of the above embodiments. After the semiconductor layer 21 is formed with respect to the first substrate SUB1 (process PS1), organic films (specifically, the first planarization film and the second planarization film) are formed (process PS2). When the second planarization film is formed, the adjustment area(s) shown in FIG. 2, FIG. 5 or FIG. 7 is (are) selected.

After the planarization films are formed, ITO and a pixel electrode are formed (process PS3). Subsequently, an alignment film is formed (process PS4). After the alignment film is formed, sealing materials are applied. Subsequently, the first substrate is attached to the second substrate (processes PS5 and PS6). Subsequently, chemical etching is applied with hydrofluoric acid to the glass plates of the first and second substrates such that the glass plates are thin (process PS7). Subsequently, the through hole HOL for attaching the pointer is formed using laser light (process PS8).

A liquid crystal is injected through the inlet provided in a part of the sealing material. After the injection, the inlet is closed (process PS9). A polarizer is attached to the external side of the second substrate SUB2. Subsequently, a reinforcing plate is attached to the upper surface of the polarizer (process SP10). By the above procedure, the trace of the inlet remains in the display device after the liquid crystal is encapsulated. For example, a sealant remains after the inlet is closed.

Figure 9:
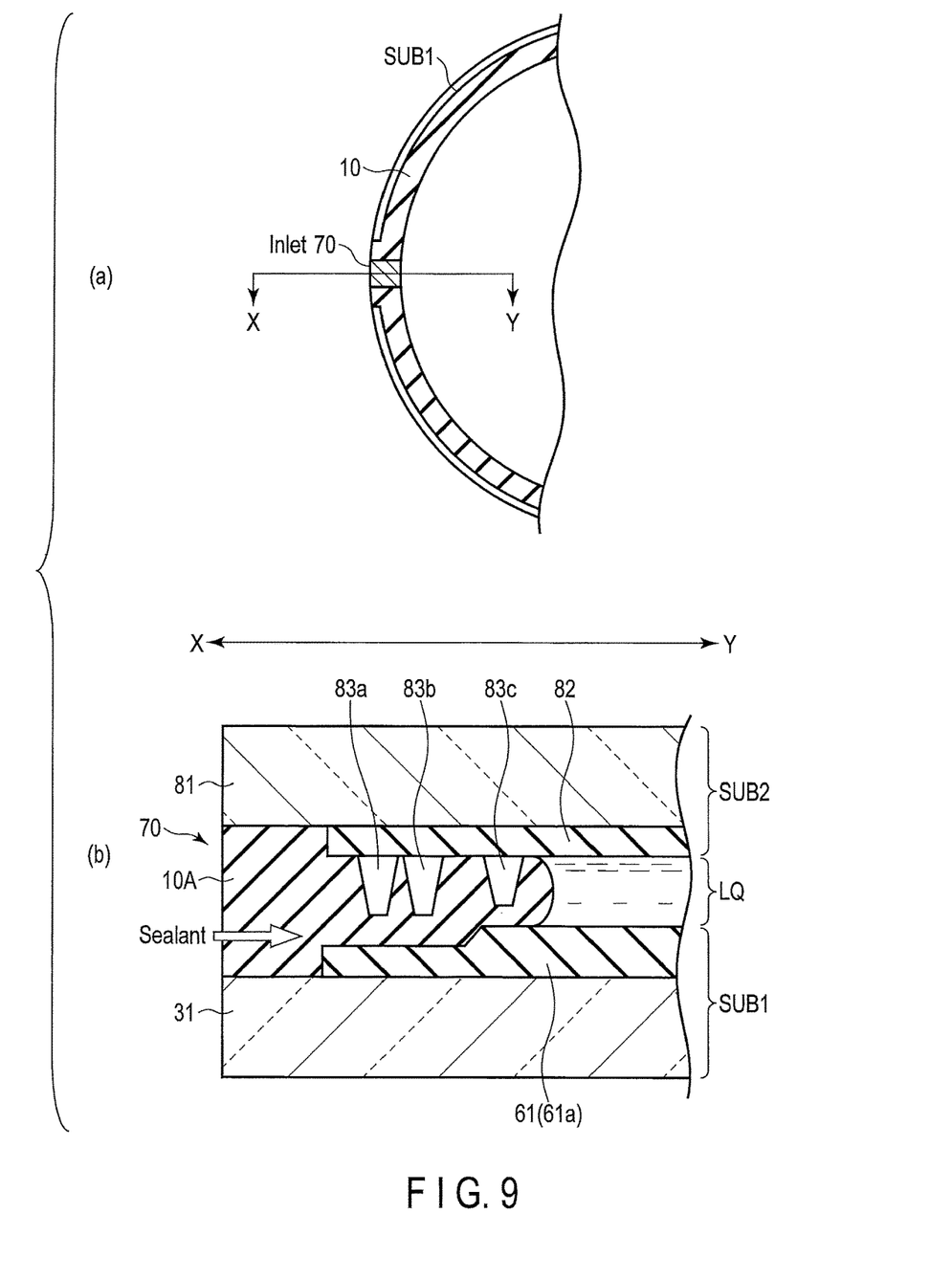
FIG. 9 includes a planar view and a cross-sectional view showing the vicinity of an inlet for a liquid crystal.

FIG. 9(a) is a planar view showing an inlet 70 formed to inject a liquid crystal. FIG. 9(b) is a cross-sectional view taken along line X-Y. When the first substrate SUB1 is attached to the second substrate SUB2, the inlet 70 is formed in a part of sealing material 10. In other words, in the middle of application of sealing material 10 into a ring shape, the sealing material is disconnected to form the inlet 70. In the inlet 70, a planarization film 82 formed on the glass plate 81 of the second substrate SUB2 faces the planarization film 61 (61a) formed on the glass plate 31 of the first substrate SUB1. Spacers 83a, 83b and 83c are provided on the planarization film 82 of the second substrate SUB2 to maintain the strength. The inlet 70 is sealed by sealant 10A after the liquid crystal is injected.

Figure 10:
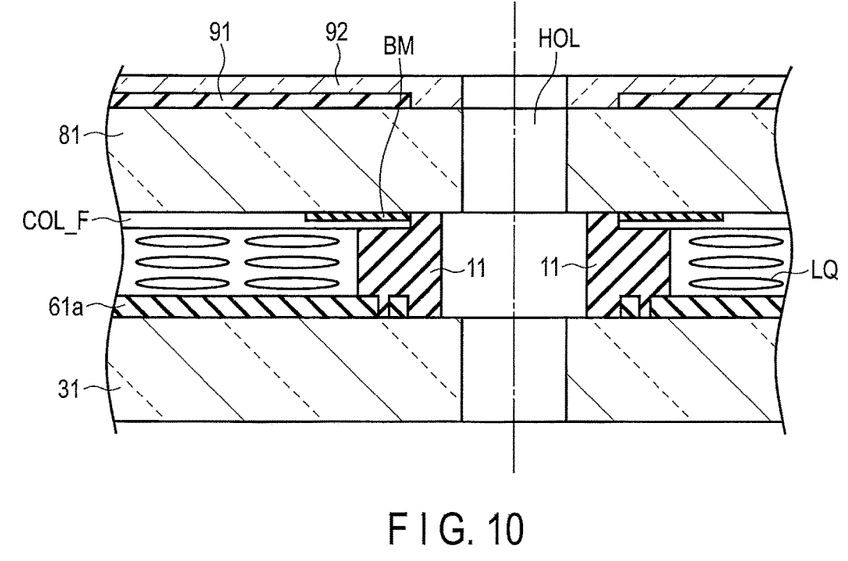
FIG. 10 shows the relationship between a polarizer and a reinforcing plate around a through hole in the display device according to the present embodiment.

FIG. 10 shows the positional relationships between the members formed on the glass plate 81 of the second substrate SUB2 and the members formed on the first substrate SUB1 around the through hole HOL. A light-shielding film BM is formed on the liquid crystal layer LQ side of the glass plate 81. A polarizer 91 is attached to the external side of the glass plate 81 (in other words, to the side opposite to the liquid crystal layer). Moreover, a reinforcing plate 92 is attached to the upper surface of the polarizer 91. In a planar view, the light-shielding film BM provided near the through hole HOL overlaps at least the second area and the third area. The light-shielding film BM may at least partially overlap the first area, the second area, the third area and the fourth area. Near the through hole HOL, the inner circumferential edge of the reinforcing plate 92 is closer to the through hole HOL than the inner circumferential edge of the polarizer 91. The liquid crystal layer LQ is located between the first substrate SUB1 and the second substrate SUB2. The polarizer 91 is provided on a side of the second substrate SUB2 so as to be opposite to the liquid crystal layer LQ. Moreover, the reinforcing plate 92 is provided on the upper surface of the polarizer 91. Around the through hole HOL, the radius of the inner circumferential edge of the polarizer 91 is greater than that of the reinforcing plate 92. This structure prevents the exposure of the light-shielding film BM on the inner circumferential side to outside through the reinforcing plate 92. When the polarizer 92 extends to the inner circumferential side, the light-shielding film BM is exposed to outside through the polarizer 92. However, the exposure of the light-shielding film BM to outside is prevented by the above structure.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A display device comprising:
    a first substrate comprising a first area, a second area, a third area, a fourth area and a fifth area from a first end portion to an inner side in a planar view;
    an organic insulating film which is present in the second area and the fourth area, and is present neither in the third area nor in the fifth area;
    a conductive film continuously formed on the organic insulating film of the second area, the third area, the organic insulating film of the fourth area and a part of the fifth area;
    a second substrate facing the first substrate;
    a first sealing material which is present in a part of the second area, the third area, the fourth area and a part of the fifth area, and is used to attach the first substrate and the second substrate; and
    a through hole which is adjacent to an inner side of the fifth area and penetrates the first substrate and the second substrate, wherein the organic insulating film formed in the fourth area is arranged in a bank shape along a second end shape of the through hole, the fourth area includes a non-formation region where the organic insulating film is not formed as an adjustment region, and the non-formation region is filled with the first sealing material.

2. The device of claim 1, wherein the organic insulating film of the fourth area further comprises a step area as the adjustment area such that the fifth area side is thinner than the third area side, and the sealing material overlaps the step area.

3. The device of claim 1, wherein the conductive film is continuously formed from connective metal connecting a drive switching element including a semiconductor channel and a pixel electrode.

4. The device of claim 1, wherein a liquid crystal layer is provided between the first substrate and the second substrate, a polarizer is provided on a side of the second substrate so as to be opposite to the liquid crystal layer, a reinforcing plate is provided on an upper surface of the polarizer, and a radius of an inner circumferential edge of the polarizer is greater than a radius of an inner circumferential edge of the reinforcing plate around the through hole.

5. The device of claim 1, further comprising:

a second sealing material joining the first substrate and the second substrate at a second end portion side, wherein the first sealing material has no liquid crystal injection port, and the second sealing material has an injection port into which liquid crystal is injected.

\* \* \* \* \*